(12) United States Patent
Subra et al.

(10) Patent No.: US 12,164,988 B2
(45) Date of Patent: Dec. 10, 2024

(54) METHOD FOR MANUFACTURING A SMART CARD WITH POSITIONING OF A METAL INSERT

(71) Applicant: THALES DIS FRANCE SAS, Meudon (FR)

(72) Inventors: Sébastien Subra, Auriol (FR); Frédérick Seban, Auriol (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/256,638

(22) PCT Filed: Dec. 10, 2021

(86) PCT No.: PCT/EP2021/085184
§ 371 (c)(1),
(2) Date: Jun. 9, 2023

(87) PCT Pub. No.: WO2022/123003
PCT Pub. Date: Jun. 16, 2022

(65) Prior Publication Data
US 2024/0020507 A1  Jan. 18, 2024

(30) Foreign Application Priority Data
Dec. 11, 2020 (EP) ..................... 20306542

(51) Int. Cl.
*G06K 19/077* (2006.01)
(52) U.S. Cl.
CPC . *G06K 19/07722* (2013.01); *G06K 19/07773* (2013.01)

(58) Field of Classification Search
CPC .................. G06K 19/07722; G06K 19/07773
USPC .......................................... 235/492
See application file for complete search history.

(56) References Cited

U.S. PATENT DOCUMENTS

| 11,755,873 B1* | 9/2023 | Finn ................. G06K 19/07749 235/492 |
| 2018/0025261 A1 | 1/2018 | Mosteller |
| 2019/0384261 A1 | 12/2019 | Nam et al. |
| 2021/0073608 A1* | 3/2021 | Finn ........................ B21D 5/16 |
| 2022/0027702 A1* | 1/2022 | Kang ............... G06K 19/07747 |

(Continued)

FOREIGN PATENT DOCUMENTS

| KR | 20180020097 A | 2/2018 |
| WO | 2020126573 A1 | 6/2020 |

OTHER PUBLICATIONS

International Search Report (PCT/ISA/210) and Written Opinion (PCT/ISA/237) mailed on Feb. 8, 2022, by the European Patent Office as the International Searching Authority for current International Application No. PCT/EP2021/085184—[11 pages].

*Primary Examiner* — Allyson N Trail

(57) ABSTRACT

Provided is a method for manufacturing a metal smart card comprising a metal insert having a peripheral edge extending to the peripheral edge of the card and at least one printed cover sheet. The method comprises the steps of assembling a printed support sheet and at least one insert using an assembly tray comprising elements for positioning the support sheet and each insert, and extracting each metal smart card from the printed support sheet by cutting or machining the sheet around a periphery of the insert. Other embodiments disclosed.

11 Claims, 3 Drawing Sheets

(56) References Cited

U.S. PATENT DOCUMENTS

| | | | |
|---|---|---|---|
| 2023/0137393 A1* | 5/2023 | Lotya | G06K 19/07783 29/850 |
| 2023/0206021 A1* | 6/2023 | Choo | G06K 19/07775 235/492 |
| 2024/0020507 A1* | 1/2024 | Subra | G06K 19/07773 |

* cited by examiner

Section A-A or B-B

METHOD FOR MANUFACTURING A SMART CARD WITH POSITIONING OF A METAL INSERT

FIELD

The invention relates to the field of contactless metal smart cards comprising radio-frequency integrated circuit chip modules.

It relates in particular to the manufacture of smart cards comprising one or more metal sheet(s) or plate(s).

Smart cards can be of the hybrid type (contact and contactless) or purely contactless (without electrical contact block).

Smart cards can have a smart card module comprising on an insulating substrate a radio-frequency transponder comprising the chip and the antenna. These radio-frequency smart card modules are generally inserted in a cavity of the card body.

The invention relates more particularly to bank cards comprising a predominantly metallic body.

BACKGROUND

There is currently an increased demand from the public for heavy smart cards incorporating metallic materials, the metal of which emerges at the edge or on the card strip. However, this renders the manufacturing methods more complex in order to obtain cards that comply with current smart card standards.

Patent FR 2743649 describes a smart card module, with an antenna and/or contact pads, which can be incorporated into a card body cavity or which can form an RFID electronic tag.

Furthermore, hybrid radio-frequency devices are also known, such as contact and contactless cards comprising a smart card module with contacts incorporated in a card body and connected to an antenna housed in the card body.

Furthermore, there are bank cards comprising metal elements such as aluminium, titanium or gold inserted inside the plastic card body or on the outer surface of the card body. The metal provides a heavy feeling to the card which is highly appreciated by the users. It also gives a visible aesthetic appearance which makes it a high-end product for privileged persons.

SUMMARY

The invention aims to address the above-mentioned disadvantages or objectives.

In current manufacturing methods, the position of a plurality of metal inserts sandwiched between two polymer sheets can move during assembly. This generates yield losses during the extraction of each card with an insert by cutting the sandwich structure.

These cards obtained by these methods have a weight of 12.5 g, which is insufficient with respect to market demand.

The cards with metal edges which are the subject matter of the invention are assumed to be at least 16 g. The only possibility, imagined by the inventors, to achieve this objective is to increase the thickness of the metal plate, which necessarily requires printing directly on the metal (rather than on a cover sheet or overlay).

Patent application WO2019/032578 A1 describes a method for locating metal inserts by X-ray in order to extract them easily and with precision. It is also known to interconnect metal inserts with one another in order to maintain their position.

The invention also provides a metal card structure with visible metal edges providing maximum weight, having good radio-frequency performance and which is easy to manufacture.

In particular, the invention relates to a card structure with a radio-frequency RF electronic chip module.

The card can also have a structure that meets constraints of mechanical strength in terms of applicable ISO standards and durability over time. Such cards can conform in particular to the ISO 7810, ISO 7816 and/or ISO/IEC 14443 standards or equivalents for carrying out contact and/or proximity communication exchanges with a contact or NFC reader.

The invention may consist, according to a preferred embodiment, of placing at least one or preferably several individual metal cards in ISO 7810 format on an assembly or inlay tray transformed for this purpose.

The tray can be made of metal or a highly temperature-resistant polymer. The tray restricts the movement of the metal insert during the lamination process. Needles or pegs positioned or indexed on the assembly tray also allow printed sheets and the lamination tray to be perfectly indexed or positioned with the metal inserts.

The antenna may preferably be produced by inlaying a conductive wire in a polymer sheet, in particular made of PVC.

Where appropriate, according to a practical embodiment, a relay antenna can be formed (or embedded in) a substrate or block of polymer material or any material permeable to electromagnetic fields, the dimensions of which correspond to that of a recess (or cavity) of a metal plate.

The radio-frequency transponder chip module can be itself mounted on an insert before or after assembling the antenna in the metal plate.

To this end, the invention relates to a method for manufacturing a metal smart card comprising a metal insert having a peripheral edge extending to the peripheral edge of the card and at least one printed cover sheet, said method comprising the following steps:
  assembling a printed support sheet and at least one insert using an assembly tray comprising elements for positioning the support sheet and each insert,
  extracting each metal smart card from the printed support sheet by cutting or machining the sheet around a periphery of the insert.

The method may include the following other features or steps:
  the positioning elements may include positioning needles perpendicular to the assembly tray, passing through the sheets via indexing perforations arranged in the sheets at a distance from each insert;
  a step of using a thickness compensation sheet for each insert, said compensation sheet comprising at least one housing configured to the dimensions of the insert in order to receive the insert during assembly, and perforations configured to engage with said positioning elements of the assembly tray in order to position them with respect to the insert;
  a step of removing said support sheet assembled with at least said insert with respect to the first tray, and a step of turning over said structure to place it on a second tray having second positioning elements so that each insert has a free outer face exposed outwards;

a step of inserting a radio-frequency module into a cavity formed in the insert and permeable to the radio-frequency field and a step of graphic personalisation of said outer face;

the insert may comprise or be formed of a metal plate P around said cavity;

a relay antenna and/or a radio-frequency module can be produced on a support substrate in the format substantially corresponding to said cavity;

the relay antenna with its support substrate is assembled with the insert so as to position the relay antenna opposite said permeable space;

the radio-frequency module can preferably be covered with a masking material;

the masking material can be deposited by graphic printing, screen printing, material jet, inkjet, lamination or film fixing;

the method can comprise a graphic printing step (personalised or not) directly on the metal insert.

DETAILED DESCRIPTION

In general, identical or similar references from one figure to another represent an identical or similar element.

Figure 1:
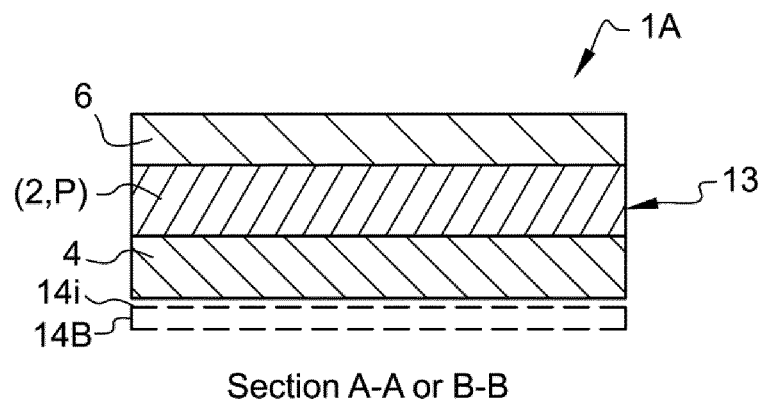
FIG. 1 illustrates a card structure in accordance with one embodiment of the method of the invention showing an assembly of a metal plate 2 with a printed cover sheet and a possible transparent protective film.

FIG. 1 illustrates a card structure obtained according to one embodiment of the method for manufacturing a metal smart card 1A comprising a metal insert 2.

Figure 6:
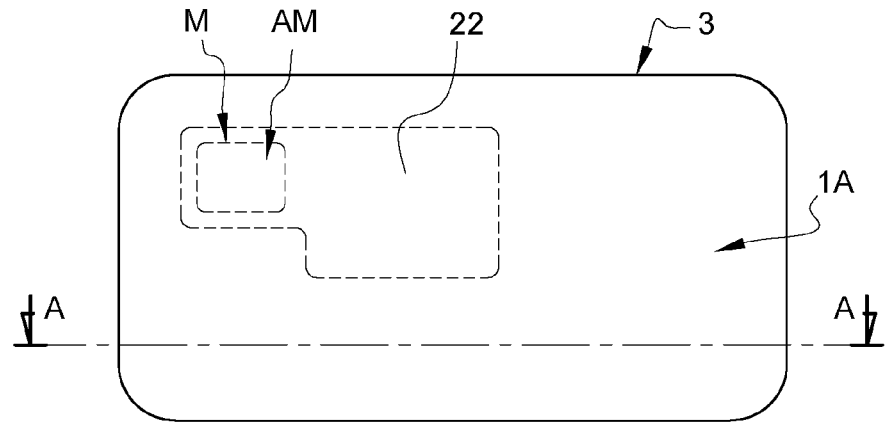
FIG. 6 illustrates a hybrid card structure (contact and contactless) obtained after covering a filling layer in the cavity 21 on the antenna support, with a location M for inserting a module and for coupling same to the antenna of FIG. 2.

The insert 2 is here in the form of a metal plate P and has a peripheral edge or contour 13 which extends to the peripheral edge 3 of the finished card 10 (FIG. 6). The card also comprises at least one cover sheet 4 printed (with a first graphic printing 14*i*, 14*j*, 14*k*, 14*n*) on one of its main faces 1A. It may also preferably comprise a protective film (overlay) 14B above the printed sheet.

The card also preferably comprises a second personalisation graphic printing 6 produced directly on the metal insert 2 on its face opposite to that bearing the plastic sheet 4.

The card here comprises a metal plate P, for example made of steel, of 16 grams or more. The plate P extends to the peripheral edge 3 of the card.

Figure 7:
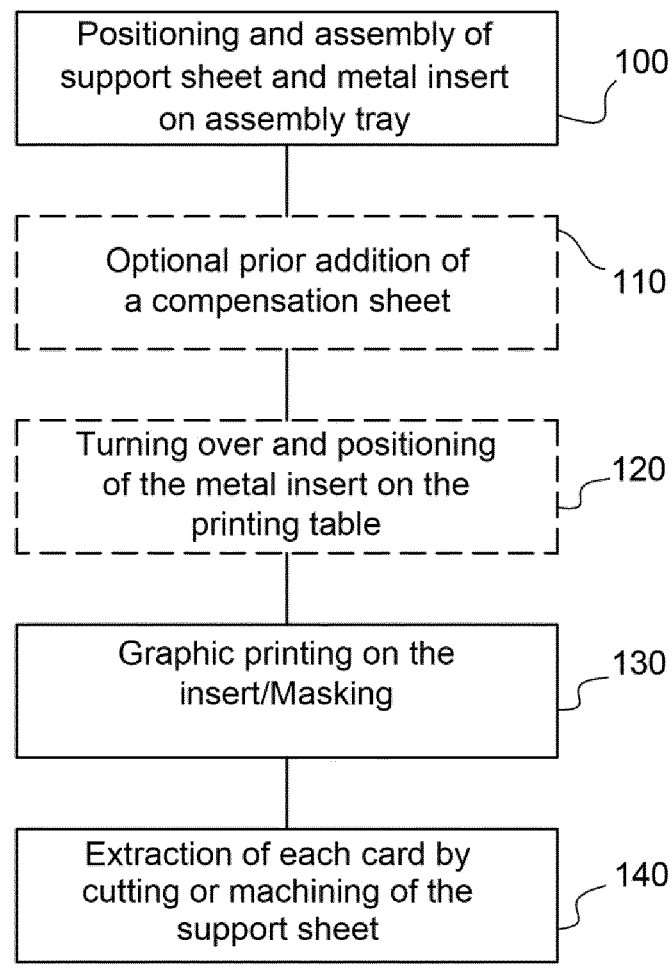
FIG. 7 illustrates the steps of the method of the invention according to a preferred embodiment.

The method comprises the following steps according to a preferred embodiment which is illustrated in relation to FIG. 7 and the various structural FIGS. 1-4.

In step 100, (also visible in FIG. 3), the method performs the positioning and assembly of a printed 14*i* support sheet 4 and at least one metal insert 2 using an assembly tray 5.

The assembly tray 5 comprises for this purpose positioning elements 15, 16 for positioning the printed 14*i* support sheet 4 and each insert 2. In the example, these are at least two needles or pegs 15, 16.

For its part, the printed support sheet 4 preferably comprises a plurality of insert locations 19, a plurality of first printings 14*i*-14*n* each corresponding to a graphic printing of a smart card, and positioning marks 25, 26 (for example perforations) configured to engage with the positioning elements of the assembly tray.

Each first graphic personalisation 14*i*-14*n* can be different from another personalisation (photograph of a user, user name, bank card number, company logo, etc.).

Each first graphic printing 14*i*, 14*j*, 14*k* . . . 14*n* has preferably been produced by being indexed precisely with respect to marks or perforations 25, 26 situated for example at the margin of the support sheet or at a distance from the insert locations 29E.

Each first graphic printing 14*i* can be carried out in particular by inkjet, screen printing, or any other method known to a person skilled in the art.

Figure 3:
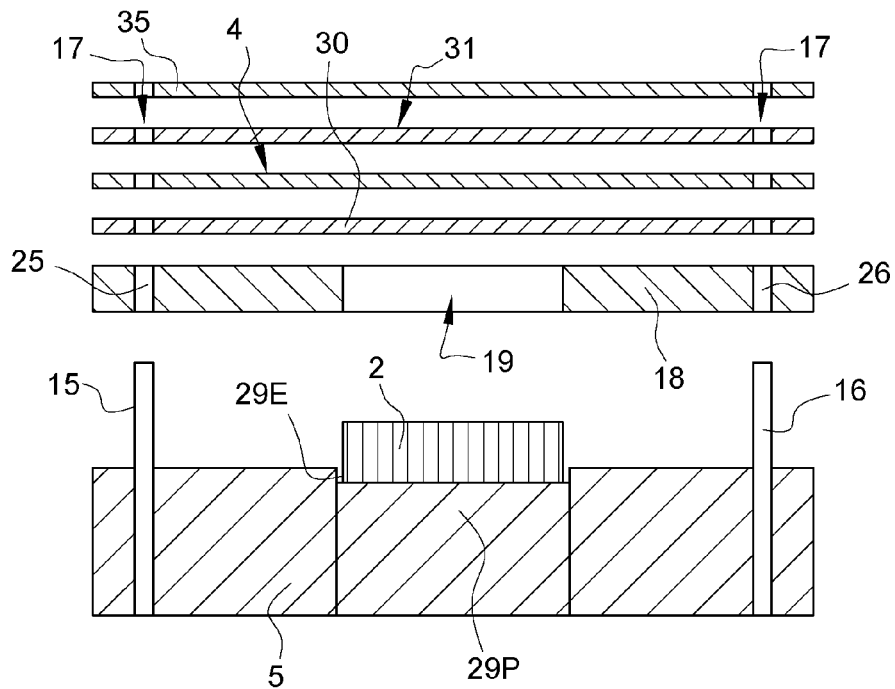
FIGS. 3 and 4 illustrate steps of assembling the metal insert with at least one printed support sheet.

In the example, FIG. 3, the metal insert is placed in its temporary location 29 resting on the tray 5.

According to one feature, the positioning elements 15, 16 of the tray can comprise positioning needles perpendicular to the assembly tray; these needles 15, 16 pass through the different sheets of the assembly (support 4, compensation 18, protection 31) via indexing perforations 17, 25, 26 arranged in each sheet of the assembly at a distance from each insert 2.

Alternatively, the positioning elements of each support sheet 4 and of the insert 2 can be formed by a frame that centres all of the sheets.

Alternatively, positioning elements such as needles can be arranged in an area of the card intended to be subsequently machined, such as an insert cavity for an integrated circuit module of a smart card or a fingerprint sensor module or other elements flush with the surface of the card. Thus, the advantage is to be able to eliminate the positioning elements (perforation) of the support sheet (located at a distance from the inserts and which engage with those of the insert and/or of the assembly tray). The method thus allows more insert locations on the same support sheet or makes it possible to operate on support sheets in the same format as the inserts. The removal of the perforation can be carried out during the machining of the AM module cavity.

For example, one or more needles may pass through the sheets at the cavity or location of the AM module (FIG. 6).

Alternatively, the insert may include keying elements, notches, ribs or bosses which can engage with keying elements, notches, ribs or bosses arranged in at least the printed support sheet 14*i*.

At least two needles of the tray may pass through the inserts at the location of each AM module cavity in order to precisely position the printed support sheet 14*i* with respect to each insert.

Thus, the invention makes it possible to position the inserts precisely with respect to this plate with protrusions or needles.

The invention may provide at least one protrusion such as a needle, passing through the insert in an area within the antenna substrate cavity 21 and the AM module placement cavity while extending beyond the top surface of the insert in order to thread a hole in the printed support sheet 14*i* so as to position it precisely with respect to the table (or tray 5) and consequently also with respect to the insert. The protrusion or needle may not extend heightwise as far as a cavity plane P1.

The invention can provide centring cores (not shown) to be placed in the cavities 21 and which comprise a needle (or peg or pin) oriented perpendicular to the plane of the metal insert, preferably in the region of the AM module cavity.

These cores may preferably comprise two needles, first and second, spaced as far apart as possible (or first and second positioning pins), configured to engage in the assembly tray and precisely position each insert since the core has substantially the shape of the cavity 21. This core can also include a third needle (or pin) extending through a perforation of the printed support sheet in the area of the M module. These three needles can be distributed in the corners of the cavity of the radio-frequency module After pressing, the method provides for removing the centring and/or centre cores or keeping them in the lower tray 5 while the laminated structure is removed from the tray and turned over to be placed on a graphic printing table.

In step 110 (FIGS. 7 and 3), if necessary, optionally to facilitate assembly, a compensation sheet 18 to compensate for the thickness of the insert and for centring the insert, can be used by being threaded (or positioned) beforehand via its perforations 25, 26 onto the needles 15, 16 of the assembly tray 5. For this purpose, the compensation sheet 18 may comprise corresponding perforations 25, 26 similar to the perforations 17 of the support sheet 4.

In the preferred and illustrated example, the method comprises the use of this thickness compensation sheet 18 for each insert. The compensation sheet comprises at least one housing 19 configured with the dimensions of the insert in order to receive the insert during the assembly and the perforations 25, 26.

Another advantage of the compensation sheet is to cover the edge or the peripheral strip of the insert 2 during a graphic printing of the free face of the insert (opposite to that adhering to the support sheet).

The insert 2 can then be inserted into the housing 19 of the compensation sheet and is thus positioned with respect to the positioning needles 15, 16 via the compensation sheet. The compensation sheet may be configured with a flared or chamfered insert insertion rim at the mouth (periphery of the housing 19) to facilitate the insertion of the insert.

Alternatively, without the compensation sheet 18, the tray 5 may include a location or housing 29E formed in the tray and precisely indexed or marked with respect to the needles 15, 16. Here, the location 29E may correspond to the surface of a punch 29P sliding in the lower assembly tray 5. The punch 29P can be set back as in FIG. 3 (or not) with respect to the upper level of the tray and thus defines a housing or location 29E corresponding to the dimensions of the main face of the metal insert 2. The edge of the tray housing 29E may also have a chamfer or be flared to facilitate the insertion of the insert 2 onto the punch 29P inside the punch housing 29E. The second upper tray 35 may have a thickness similar to that of the first lower tray 5.

The sheets or films of the assembly comprise, in the example, an adhesive film 30 to adhere at the same time to the metal of the insert 2 and to the plastic of the support sheet 4, in particular here made of PVC. Other plastic sheets made of materials that are known to a person skilled in the art of the smart card industry can be used, such as ABS, natural or synthetic cellulose fibres, PET, polycarbonate, etc.

They also comprise in contact with the adhesive, the support sheet 4 which has a graphic printing layer 14*i* and a transparent protective layer (overlay) 14B of the graphic printing.

For the assembly, the method may optionally provide a film for lamination and protection of the tray and/or the card during lamination, between an upper lamination tray 35 and the sheets or films to be assembled.

During the lamination pressing (FIG. 4) of the insert and the sheets listed above, the method may provide for actuating the punch 29P towards the upper tray 35 in order to increase the assembly pressure at the insert.

According to another feature of the preferred embodiment, the method can comprise a step of removing said support sheet 4 assembled with at least the insert 2 with respect to the first assembly tray 5, as well as a step of turning over said structure to place it on a second tray 55 (not shown) having second positioning elements 36, 37 (not shown), so that each insert 2 has a free outer face 40 exposed outwards. If necessary, the same tray 55 can be used and the elements 36, 37 would then be identical to the positioning elements 15, 16.

Figure 5:
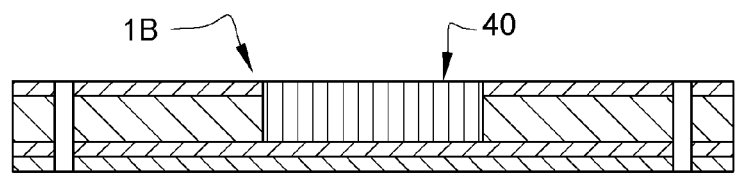
FIG. 5 illustrates a step subsequent to step 4, showing the result of the assembly removed from an assembly tray.

In the example, in FIG. 5, the product of the assembly 40 (2, 18, 30, 4 and optionally 31) is removed from the lower 5 and upper 35 trays as well as from the needles 15, 16.

In step 120 (FIGS. 7 and 5), the resulting intermediate product 1B can then be turned over and transferred to a graphic printing station for graphic printing (step 130) of the insert 2 on the free face 40 thereof.

According to one feature, the method comprises a step of inserting a radio-frequency module 20 into a cavity 21 formed in the insert and permeable to the radio-frequency field and a step of graphic personalisation of said outer face of the insert. The radio-frequency module 20 can typically comprise an antenna 32 on a substrate 22.

Figure 4:
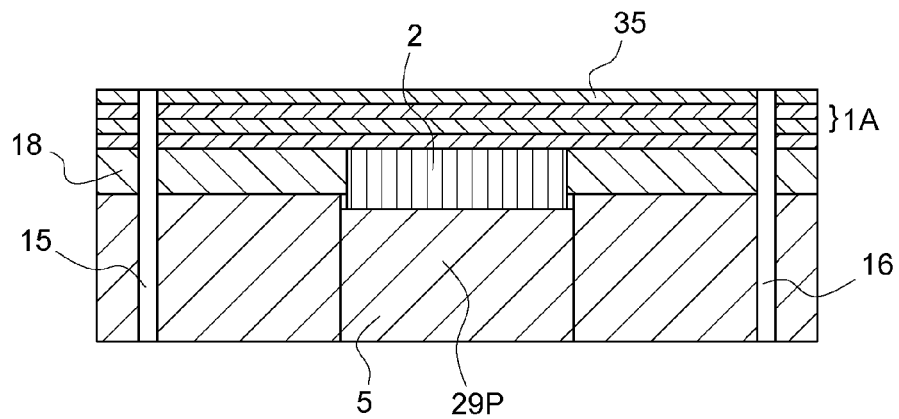

In the example, the radio-frequency module 20 is inserted into the metal insert 2 after turning over the intermediate product obtained in FIG. 4.

Alternatively, the module 20 can be inserted into the insert 2 before assembly with the sheets.

For this purpose, the insert 2 comprises or is formed of a metal plate P around said cavity 21. The cavity 21 can be produced before assembly.

Figure 2:
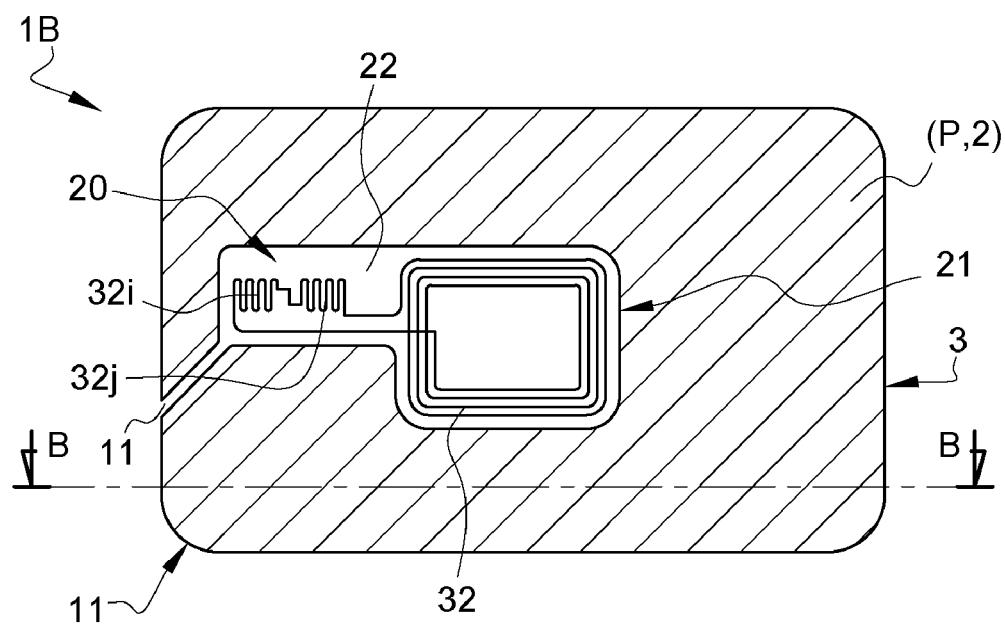
FIG. 2 illustrates a top view of a contactless card, which may include the elements of FIG. 1, showing a radio-frequency antenna housed in a cavity of a metal insert and intended to be coupled with a radio-frequency chip.

FIG. 2 illustrates an example of a cavity 21 and a radio-frequency module 20 inserted into the cavity. A relay antenna and/or a radio-frequency module 20 is produced on an insulating support substrate 22 in a format substantially corresponding to the cavity 21.

In the case of a relay antenna 21R (not shown), its support substrate 21 can be assembled with the insert 2 so as to position the relay antenna 21R opposite the space (cavity) that is permeable to radio-frequency waves of the insert. The relay antenna 21R can replace the antenna with pads for interconnection 32*i*, 32*j* to a radio-frequency module. It is inductively coupled to a radio-frequency module antenna comprising a substrate, a module antenna connected to a radio-frequency integrated circuit.

The insert 2 may comprise a plate (4) with a slot (11) intersecting the plate in its thickness and extending from an outer periphery (9) of the plate to an inner periphery of the space or cavity 21 that is permeable to the radio-frequency field.

The radio-frequency module 20 may preferably be covered with a masking material (not shown). This masking material can be produced at the graphic printing station (step 130) or at another station. The masking material can be deposited by graphic printing, screen printing, material jet, inkjet, lamination or film fixing.

Alternatively, the masking material of the antenna substrate can be applied after cutting or extracting the card.

Subsequently, (still in step 130) the method comprises a second graphic printing step 6 (FIG. 1) directly on the surface 40 (FIG. 5) of the metal insert 2.

This printing 6 can advantageously be carried out after extracting the card or before extraction. Preferably, it is carried out while the insert is on the support sheet 4 with the thickness compensation sheet 18 so as to protect the strip or edge 13 of the card from the graphic printing.

In step 140, the method extracts each metal smart card 1A from the printed support sheet 14 by cutting or machining the sheet around a peripheral contour of the insert.

The extraction can be carried out using a cutting tool of the die punch type, with blades or by shearing.

Alternatively, the method uses a cutting tool such as a milling cutter, a laser, blades, a water jet, etc., which approaches the edge 13 of the card until it touches it and which machines the support sheet directly above the contour 3 of the card.

Alternatively, the method can use a computer-aided vision system to locate the outline of the card and machine all around it. It can also use optical sensors for positioning the milling cutter with respect to the edge of the card or contact sensors detecting an electric current from the milling cutter as soon as it touches the metal insert or a capacitive current between the milling cutter and the metal insert.

The invention claimed is:

1. A method for manufacturing a metal smart card comprising a metal insert having a peripheral edge extending to the peripheral edge of the card and at least one printed cover sheet, said method comprising the following steps:
    assembling a printed support sheet and at least one insert using an assembly tray comprising elements for positioning the support sheet and each insert; and
    extracting each metal smart card from the printed support sheet by cutting or machining the sheet around a periphery of the insert,
        the method comprising the use of a thickness compensation sheet for each insert, said compensation sheet comprising at least one housing configured to the dimensions of the insert in order to receive the insert during assembly, and perforations configured to engage with said positioning elements of the assembly tray in order to position them with respect to the insert.

2. The method according to claim 1, wherein in positioning elements comprise positioning needles perpendicular to the assembly tray, passing through the sheets via indexing perforations arranged in the sheets at a distance from each insert.

3. The method according to claim 1, comprising a step of removing said support sheet assembled with at least said insert with respect to the first tray, and a step of turning over said structure to place it on a second tray having second positioning elements, so that each insert has a free outer face exposed outwards.

4. The method according to claim 3, comprising a step of inserting a radio-frequency module into a cavity formed in the insert and a permeable space to the radio-frequency field and a step of graphic personalisation of said outer face.

5. The method according to claim 4, wherein the insert comprises or is formed of a metal plate P around said cavity.

6. The method according to claim 4, wherein in the relay antenna with its support substrate is assembled with the insert so as to position the relay antenna opposite said permeable space.

7. The method according to claim 1, wherein a relay antenna- and/or a radio-frequency module is produced on a support substrate in the format substantially corresponding to said cavity.

8. The method according to claim 1, wherein said insert is a plate comprising a slot intersecting the plate in its thickness and extending from an outer periphery of the plate to an inner periphery of said permeable space that is permeable to the radio-frequency field.

9. The method according to claim 1, wherein said radio-frequency module is covered with a masking material.

10. The method according to claim 1, wherein said masking material is deposited by graphic printing, screen printing, material jet, inkjet, lamination or film fixing.

11. The method according to claim 1, comprising a graphic printing step for printing directly on the metal insert.

* * * * *